US011287733B2

(12) United States Patent
Hsu et al.

(10) Patent No.: US 11,287,733 B2
(45) Date of Patent: Mar. 29, 2022

(54) PROJECTION DEVICE AND IMAGING MODULE HAVING LIGHT ABSORBING ELEMENT THEREOF

(71) Applicant: Coretronic Corporation, Hsin-Chu (TW)

(72) Inventors: Chia-Ho Hsu, Hsin-Chu (TW); Hao-Wei Chiu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/819,191

(22) Filed: Mar. 16, 2020

(65) Prior Publication Data
US 2020/0314392 A1 Oct. 1, 2020

(30) Foreign Application Priority Data

Mar. 25, 2019 (CN) .......................... 201920379608.8

(51) Int. Cl.
| | |
|---|---|
| *G03B 21/20* | (2006.01) |
| *H04N 9/31* | (2006.01) |
| *G03B 21/16* | (2006.01) |
| *G03B 21/28* | (2006.01) |

(52) U.S. Cl.
CPC ......... *G03B 21/2066* (2013.01); *G03B 21/16* (2013.01); *H04N 9/3144* (2013.01); *G03B 21/204* (2013.01); *G03B 21/28* (2013.01); *H04N 9/3102* (2013.01)

(58) Field of Classification Search
CPC ................ G03B 21/005; G03B 21/204; G03B 21/2066; G03B 21/28; H04N 9/3102; H04N 9/3141
See application file for complete search history.

(56) References Cited

U.S. PATENT DOCUMENTS

| | | | | |
|---|---|---|---|---|
| 5,552,922 A | * | 9/1996 | Magarill ............ | G02B 26/0833 353/81 |
| 5,604,624 A | * | 2/1997 | Magarill ............ | G02B 26/0833 353/81 |
| 6,179,424 B1 | * | 1/2001 | Sawamura ......... | G02B 26/0841 348/771 |
| 6,185,047 B1 | * | 2/2001 | Peterson ............ | G02B 26/0833 348/E5.142 |
| 6,349,006 B1 | * | 2/2002 | Okamori .................. | G02B 5/04 348/E5.142 |

(Continued)

FOREIGN PATENT DOCUMENTS

CN 205374858 U 7/2016

*Primary Examiner* — Bao-Luan Q Le (57) ABSTRACT

An imaging module includes a reflective display element, a prism device and a light absorbing element. The reflective display element includes a reflective display surface. The prism device includes first and second prisms. The first prism includes first, second and third surfaces. The second prism includes fourth, fifth and sixth surfaces. A stray light beam is incident into the first prism, passes through the third surface and then exits the first prism, then the stray light beam is incident into the second prism through the fourth surface, and then the stray light beam is reflected by the fifth surface and then exits the second prism. The light absorbing element is disposed on a transmission path of the stray light beam exiting the second prism. A projection device including the imaging module is also provided.

16 Claims, 5 Drawing Sheets

(56) References Cited

U.S. PATENT DOCUMENTS

| | | | | |
|---|---|---|---|---|
| 6,357,878 B1* | 3/2002 | Sawamura | ............ | G02B 27/145 |
| | | | | 348/771 |
| 6,454,417 B1* | 9/2002 | Takamoto | .......... | G02B 26/0833 |
| | | | | 348/771 |
| 6,471,356 B1* | 10/2002 | Gohman | ............ | G02B 26/0833 |
| | | | | 348/E5.142 |
| 6,560,048 B1* | 5/2003 | Okamori | .............. | G02B 27/283 |
| | | | | 348/E5.142 |
| 6,908,197 B2* | 6/2005 | Penn | ....................... | G02B 5/04 |
| | | | | 348/771 |
| 6,951,394 B2* | 10/2005 | Chang | ................. | G03B 21/008 |
| | | | | 353/33 |
| 9,900,563 B2* | 2/2018 | Terada | ................... | H04N 9/315 |
| 9,933,697 B2* | 4/2018 | Lambot | ............... | G02B 27/149 |
| 10,564,532 B2* | 2/2020 | Terada | ................ | H04N 9/3144 |
| 10,620,522 B2* | 4/2020 | Morant | ............... | H04N 9/3102 |
| 2003/0123163 A1* | 7/2003 | Penn | ....................... | G02B 5/04 |
| | | | | 359/833 |
| 2006/0274273 A1* | 12/2006 | Mihalakis | .......... | G03B 21/2073 |
| | | | | 353/20 |
| 2016/0299417 A1* | 10/2016 | Lambot | ............... | G03B 21/008 |
| 2017/0285453 A1* | 10/2017 | Morant | ................. | G03B 21/28 |
| 2018/0020196 A1* | 1/2018 | Terada | ................ | G03B 21/008 |
| 2019/0094675 A1* | 3/2019 | Terada | .................. | G02B 26/10 |

* cited by examiner

PROJECTION DEVICE AND IMAGING MODULE HAVING LIGHT ABSORBING ELEMENT THEREOF

CROSS-REFERENCE TO RELATED APPLICATION

This application claims the priority benefit of China application (CN201920379608.8), filed on Mar. 25, 2019. The entirety of the above-mentioned patent application is hereby incorporated by reference herein and made a part of this specification.

FIELD OF THE INVENTION

The invention relates to a projection device and an imaging module thereof, and more particularly to a projection device and an imaging module thereof capable of avoiding the influence of stray light beam on the quality of a projected frame.

BACKGROUND OF THE INVENTION

A projection device may be used to project an image onto a projection screen for displaying to a user. The illumination system of the projection device may be configured to provide an illumination beam and it may be converted into an image beam by a light engine module. Then, the image beam may be projected onto the screen by using a projection lens, such that an image is formed on the screen.

In a projection device using a digital micro-mirror device (DMD), a total internal reflection (TIR) prism is generally used to guide an illumination beam to the DMD, and the imaged beam formed by the DMD may be projected to the projection lens. However, stray light beams that may be undesirable may stay in the projection device, and these stray light beams may be reflected in the TIR prism. The stray light beam reflected in the TIR prism may thus reduce the image quality of the projected image.

In the prior art, part of the TIR prism surfaces may be blackened to absorb a stray light beam. However, the absorbing effect may be limited. Additionally, the blackened prism surface may generate considerable heat caused from the absorbed light beam. The components of the projection device may be undesirably affected, and even damaged by the heat. Therefore, how to avoid the image quality of the projection device from being reduced by the stray light beams may be an important subject in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an imaging module and further a projection device comprising the imaging module, both of which may be used to effectively prevent the stray light beam from affecting the quality of the projected image.

Other advantages and objects of the invention may be further illustrated by the technical features broadly embodied and described as follows.

In order to achieve one or a part of or all of the objects or other objects, an embodiment of the invention provides an imaging module. The imaging module includes a reflective display element, a prism device, and a light absorbing element. The reflective display element includes a reflective display surface. The prism device includes a first prism and a second prism. The first prism includes a first surface, a second surface, and a third surface. The second prism includes a fourth surface, a fifth surface, and a sixth surface. The second surface is adjacent to the reflective display surface. The third surface is adjacent to the fourth surface. A stray light beam is incident into the first prism, passes through the third surface and then exits the first prism. Then, the stray light beam is incident into the second prism through the fourth surface, and then the stray light beam is reflected by the fifth surface and then exits the second prism. The light absorbing element is disposed on a transmission path of the stray light beam exiting the second prism.

In order to achieve one or a part of or all of the objects or other objects, an embodiment of the invention provides a projection device. The projection device includes an illumination system, a projection lens, and an imaging module. The illumination system is configured to provide an illumination beam. The imaging module includes a reflective display element, a prism device, and a light absorbing element. The reflective display element includes a reflective display surface. The prism device includes a first prism and a second prism. The first prism includes a first surface, a second surface, and a third surface. The second prism includes a fourth surface, a fifth surface, and a sixth surface. The second surface is adjacent to the reflective display surface. The third surface is adjacent to the fourth surface. A stray light beam is incident into the first prism, passes through the third surface and then exits the first prism. Then, the stray light beam is incident into the second prism through the fourth surface, and then the stray light beam is reflected by the fifth surface and then exits the second prism. The light absorbing element is disposed on a transmission path of the stray light beam exiting the second prism.

In summary, by disposing the light absorbing element, the projection device and the imaging module according to the embodiments of the invention may effectively absorb the stray light beam exiting the prism device, and thereby prevent the image quality of the projection device from being reduced by the stray light beam.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
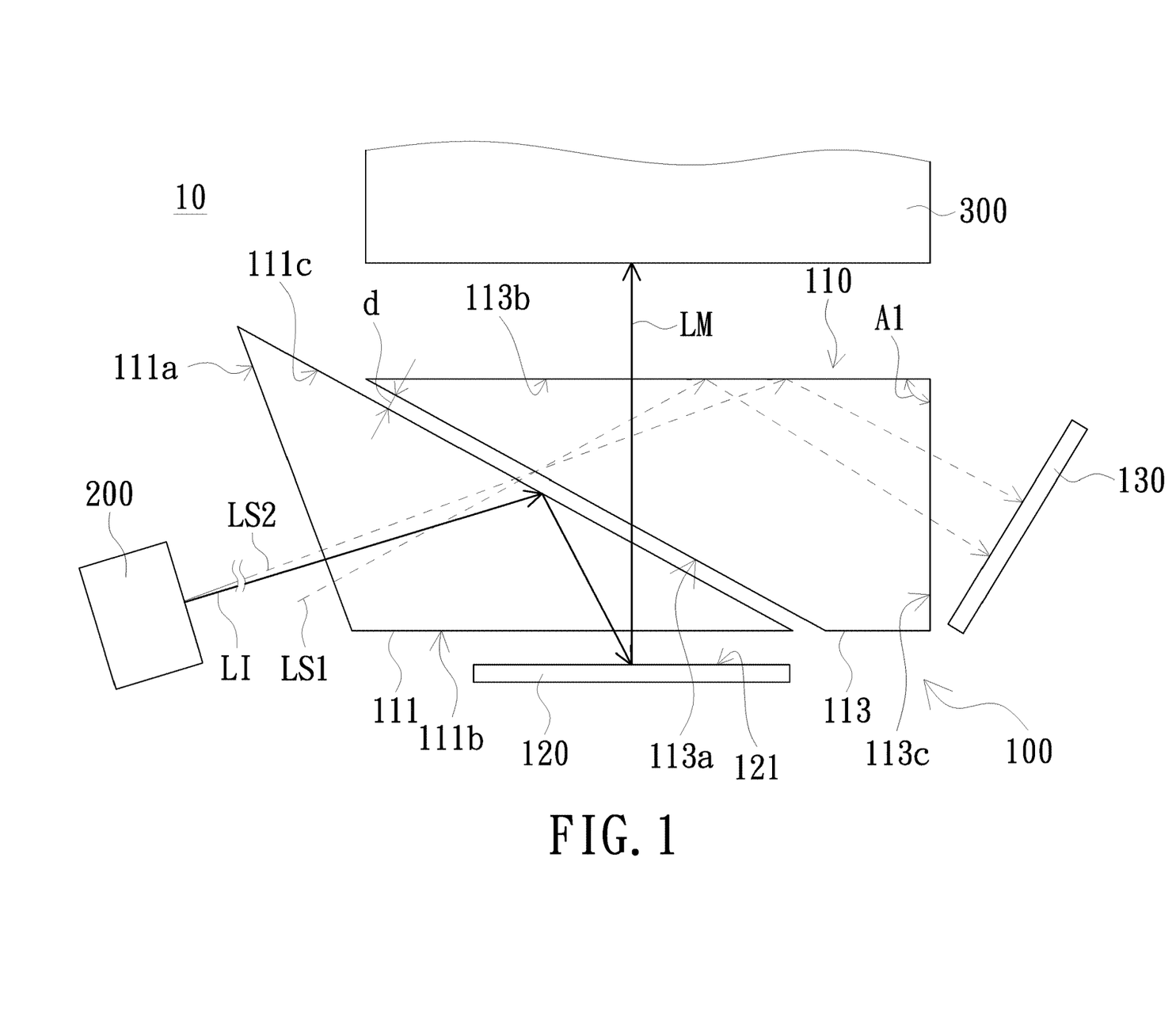
FIG. 1 is a schematic view of a projection device according to an embodiment of the invention.
Figure 2:
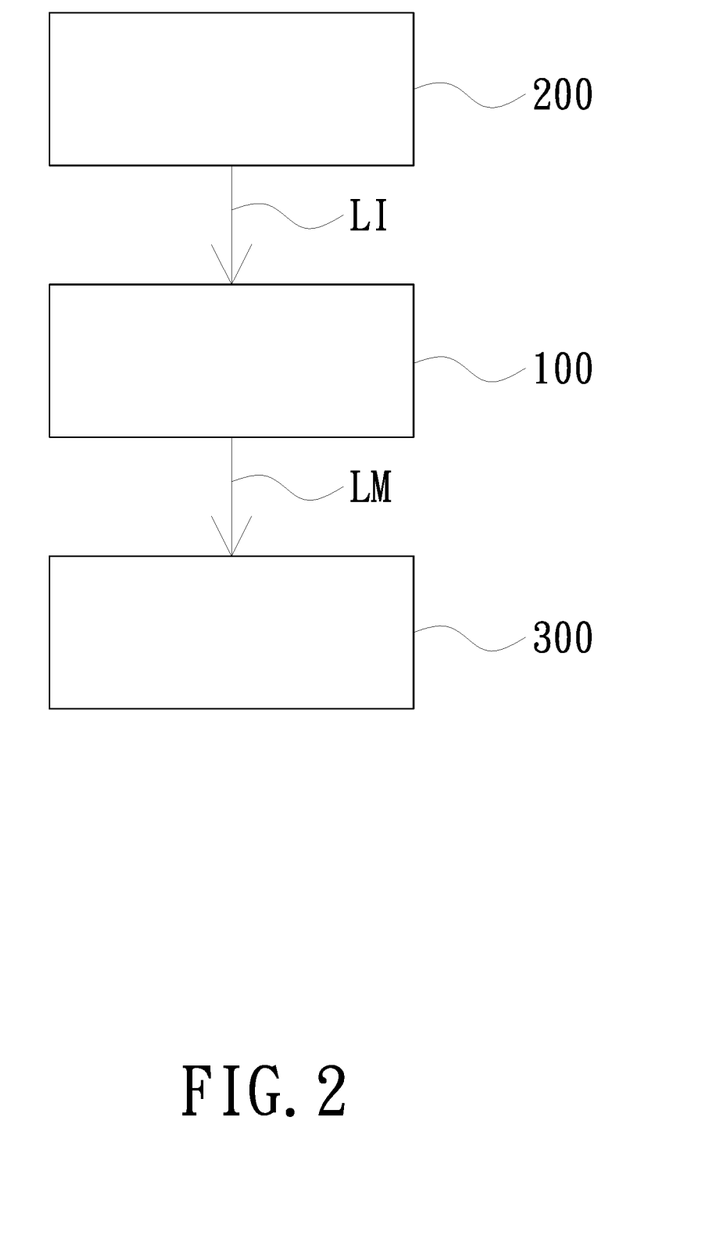
FIG. 2 is a functional block diagram of a projection device according to an embodiment of the invention.

Please refer to FIGS. 1 and 2. FIG. 1 is a schematic view of a projection device according to an embodiment of the invention. FIG. 2 is a functional block diagram of the projection device shown in FIG. 1. The projection device 10 of the embodiment includes an illumination system 200, a projection lens 300, a reflective display element 120, a prism device 110, and a light absorbing element 130. The illumination beam LI provided by the illumination system 200 may be reflected by the prism device 110 to the reflective display element 120. The reflective display element 120 converts the illumination beam LI into an image beam LM and the image beam LM is projected to the projection lens 300. The projection lens 300 projects the image beam LM to a screen (not shown) outside the projection device 10 for displaying to a user.

In the embodiment, stray light beams LS1, LS2 may stay in the projection device 10. By a design of the prism device 110 (e.g., adjusting the angle A1 shown in FIG. 1, and the angle A1 may be, for example, 90 degrees), when the stray light beams LS1, LS2 incident into the prism device 110 are reflected to the sixth surface 113c of the prism device 110, the stray light beams LS1, LS2 may pass through the sixth surface 113c and exit the prism device 110. The light absorbing element 130 is disposed on a transmission path of the stray light beams LS1, LS2 exiting the prism device 110. The light absorbing element 130 may absorb the stray light beams LS1, LS2, and thereby effectively prevent the image quality of the projection device from being reduced by the stray light beams LS1, LS2 reflected inside the prism device 110.

The stray light beams LS1, LS2 of the embodiment are merely illustrative and are not intended to limit the invention. That is, the stray light beams LS1, LS2 may be any beam that is undesirable or not used for imaging. The stray light beams LS1, LS2 may pass through the third surface 111c and exit the first prism 111, and may pass through the sixth surface 113c and exit the prism surface device 110, and the stray light beams LS1, LS2 may be absorbed by the light absorbing element 130. The stray light beam may, for example, be a part of the beam provided by the illumination system 200 and may not be reflected by the first prism 111 to the reflective display element 120. Alternatively, the stray light beam may, for example, be a part of the beam provided by illumination system 200 and may be reflected toward the prism device 110 by the housing (not shown) of projection device 10 and/or various possible components (not shown). However, the invention is not limited thereto.

In the embodiment, the projection device 10 further includes an imaging module 100. The imaging module 100 may include the reflective display element 120, the prism device 110, and the light absorbing element 130. The reflective display element 120 includes a reflective display surface 121. The prism device 110 includes a first prism 111 and a second prism 113. The first prism 111 includes a first surface 111a, a second surface 111b, and a third surface 111c. The second prism 113 includes a fourth surface 113a, a fifth surface 113b, and a sixth surface 113c. The second surface 111b of the first prism 111 is adjacent to the reflective display surface 121 of the reflective display element 120. The third surface 111c of the first prism 111 is adjacent to the fourth surface 113a of the second prism 113. The stray light beams LS1, LS2 are incident into the first prism 111. The stray light beams LS1, LS2 pass through the third surface 111c and exit the first prism 111. Then, the stray light beams LS1, LS2 are incident into the second prism 113 through the fourth surface 113a, and then the stray light beams LS1, LS2 are reflected by the fifth surface 113b and exit the second prism 113. The light absorbing element 130 is disposed on a transmission path of the stray light beams LS1, LS2 exiting the second prism 113. The light absorbing element 130 may absorb the stray light beams LS1, LS2, and thereby effectively prevent the image quality of the projected image from being reduced the stray light beams LS1, LS2 reflected inside the prism device 110.

Specifically, the imaging module 100 further includes a projection lens 300. The illumination beam LI incident into the first prism 111 is reflected by the third surface 111c and then is incident on the reflective display element 120. The illumination beam LI is, for example, totally reflected by the third surface 111c of the first prism 111 to the reflective display element 120. After the illumination beam L1 is converted into the image beam LM by the reflective display element 120, the reflective display surface 121 of the reflective display element 120 reflects the image beam LM to the projection lens 300. The projection lens 300 may project the image beam LM outside of the projection device 10.

In the embodiment, the light absorbing element 130 is, for example, adjacent to the sixth surface 113c of the second prism 113. The stray light beams LS1, LS2 are reflected by the fifth surface 113b and then exit the second prism 113 through the sixth surface 113c.

The invention does not limit the structure or the form of the light absorbing member 130, while the light absorbing member 130 is required to absorb an incident light. In other embodiments of the invention, the light absorbing element 130 may be implemented, for example, as an inner structure of a housing (not shown) of the projection device 10. In some embodiments, the light absorbing element 130 may be a metal plate with black paint or black ink. Further, the light absorbing element 130 may be a black metal plate with sandblasting-treated process. However, the disclosure is not limited thereto, and the light absorbing element 130 may be a black plate with jagged structure.

In addition, the third surface 111c of the first prism 111 and the fourth surface 113a of the second prism 113 are spaced from each other by a spacing d, and the spacing d has a non-zero length. However, the invention is not limited thereto. With the spacing d, the illumination beam LI may be reflected by the third surface 111c to the reflective display element 120, so that the stray light beams LS1, LS2 may pass through the third surface 111c and exit the first prism 111.

In addition, in the embodiment, the reflective display element 120 may be implemented, for example, as a digital micromirror device (DMD), but the invention is not limited thereto. The illumination system 200 may include, for example, a laser diode, a light emitting diode (LED), or a light bulb, and the like, and the invention is not limited thereto.

Figure 3:
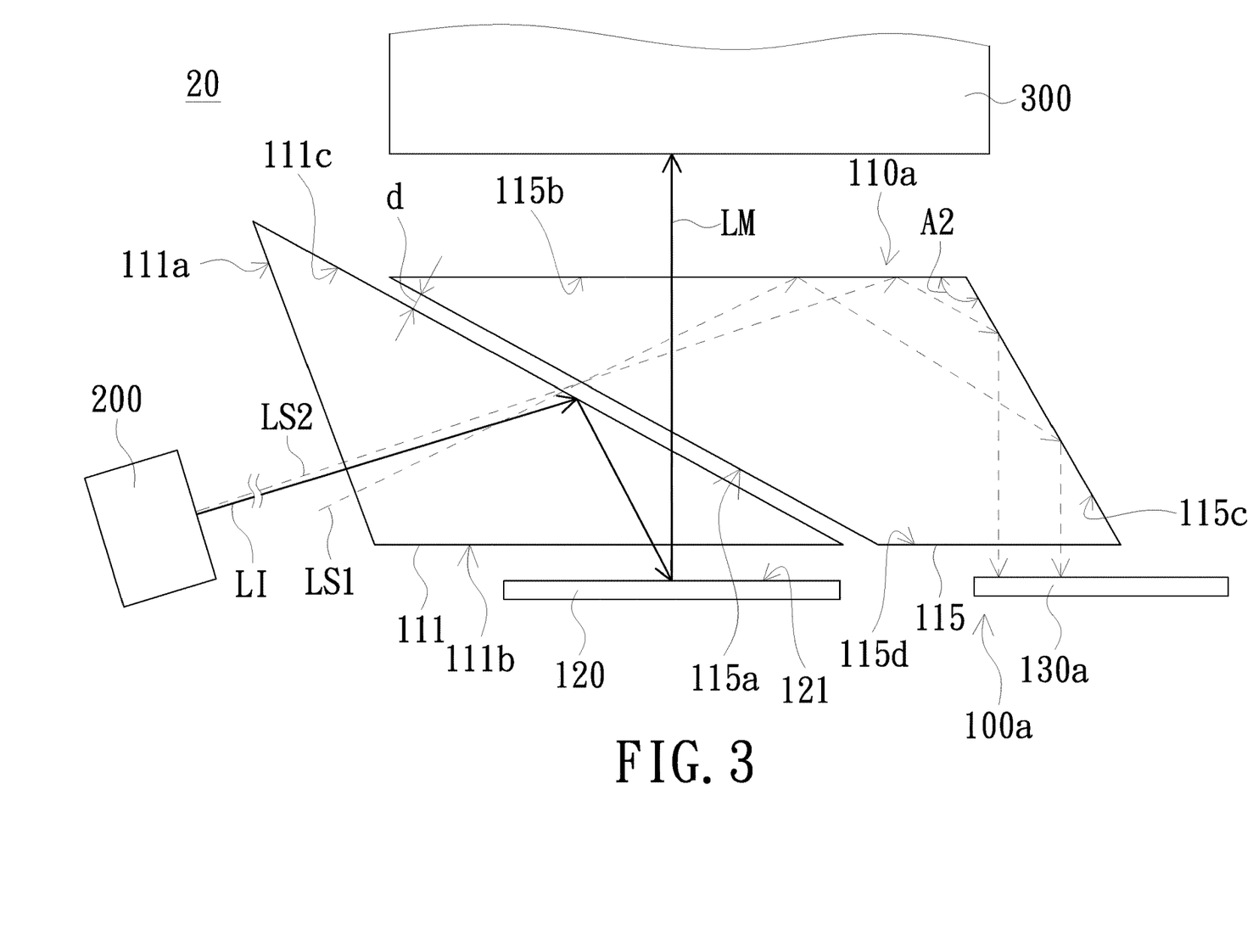
FIG. 3 is a schematic view of a projection device according to another embodiment of the invention.

Please refer to FIG. 3. FIG. 3 is a schematic view of a projection device according to another embodiment of the invention. The projection device 20 of this embodiment is similar in structure to the projection device 10 of the embodiment shown in FIGS. 1 and 2, and may be used to achieve similar functions or effects. The projection device 20 of this embodiment is different from the projection device 10 of the above embodiments in that: the second prism 115 of the imaging module 100a includes a fourth surface 115a, a fifth surface 115b, a sixth surface 115c, and a seventh surface 115d. The light absorbing element 130a is adjacent to the seventh surface 115d of the second prism 115. In the embodiment, the stray light beams LS1, LS2 are reflected by the fifth surface 115b and then transmitted to the sixth surface 115c. Then, the stray light beams LS1, LS2 are reflected by the sixth surface 115c and then exit the second prism 115 through the seventh surface 115d. Since the second prism 115 is provided with the seventh surface 115d, and by the design of the prism device 110a (e.g., adjusting the angle A2 shown in FIG. 3, and the angle A2 may be, for example, greater than 90 degrees), when the stray light beams LS1, LS2 incident into the prism device 110a are reflected to the seventh surface 115d of the prism device 110a, the stray light beams LS1, LS2 may pass through the seventh surface 115d and exit the prism device 110a. Compared with the projection device 10 of the embodiment shown in FIGS. 1 and 2, the stray light beams LS1, LS2 may be emitted downward (FIG. 3) in the projection device 20 of this embodiment, and thus the projection device 20 may in used in more various instances.

The stray light beams LS1, LS2 of the embodiment are merely illustrative and are not intended to limit the invention. That is, the stray light beams LS1, LS2 may be any beam that is undesirable or not used for imaging. The stray light beams LS1, LS2 may pass through the third surface 111c and exit the first prism 111, and may pass through the seventh surface 115d and exit the prism surface device 110a, and the stray light beams LS1, LS2 may be absorbed by the light absorbing element 130a.

Figure 4:
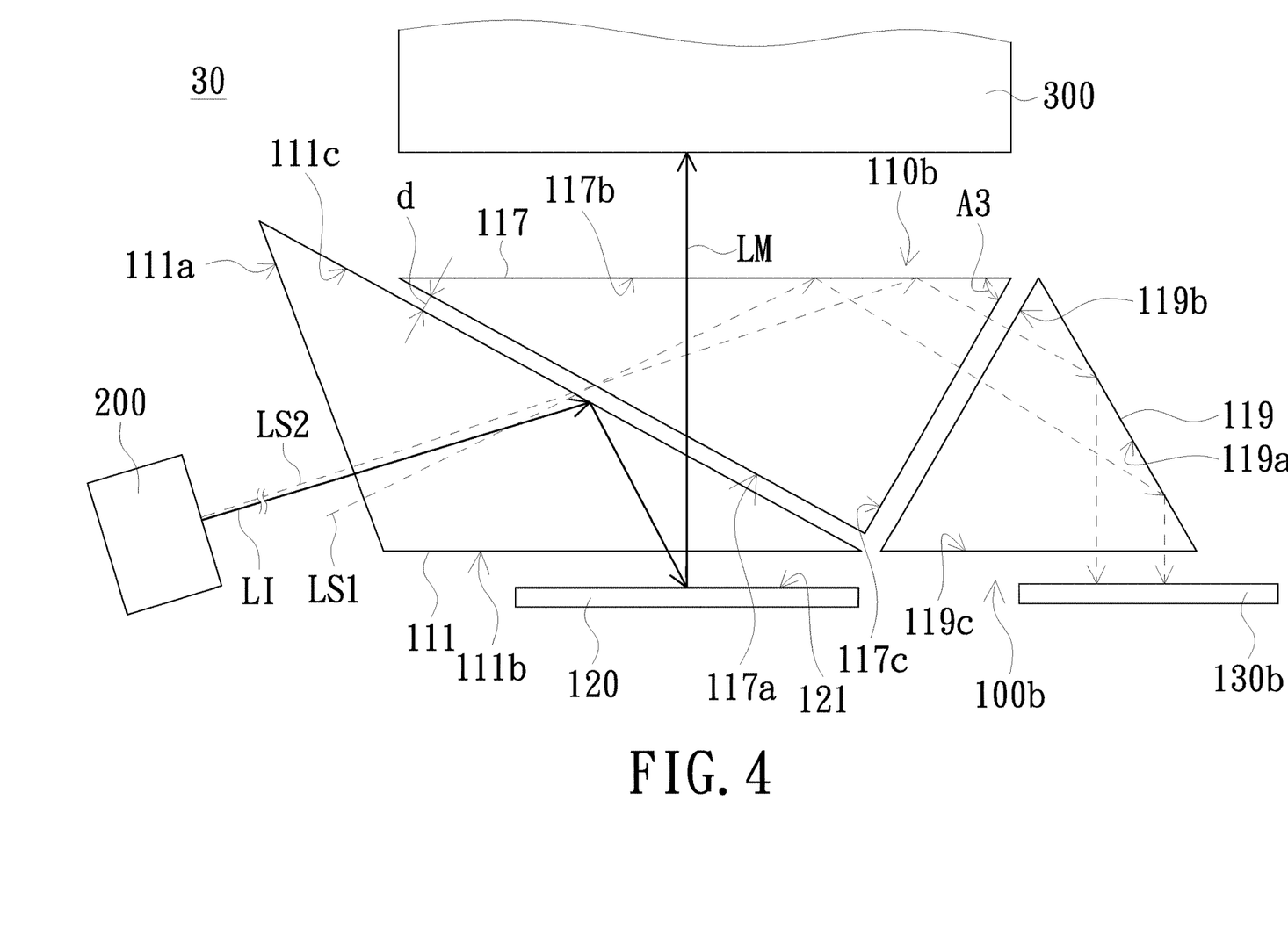
FIG. 4 is a schematic view of a projection device according to yet another embodiment of the invention.

Please refer to FIG. 4. FIG. 4 is a schematic view of a projection device according to yet another embodiment of the invention. The projection device 30 of this embodiment is similar in structure to the projection device 10 of the embodiment shown in FIGS. 1 and 2, and may be used to achieve similar functions or effects. The projection device 30 of this embodiment is different from the projection device 10 of the above embodiment in that: the imaging module 100b of the projection device 30 further includes a third prism 119. The stray light beams LS1, LS2 exit the second prism 117 and then are incident into the third prism 119, and then the stray light beams LS1, LS2 are reflected by the third prism 119 and incident on the light absorbing element 130b. Compared with the projection device 10 of the embodiment shown in FIGS. 1 and 2, the stray light beams LS1, LS2 may be emitted downward (FIG. 4) in the projection device 30 of this embodiment, and thus the projection device 30 may in used in more various instances.

In detail, the second prism 117 includes a fourth surface 117a, a fifth surface 117b, and a sixth surface 117c, and the third prism 119 includes optical surfaces 119a, 119b, and 119c. The light absorbing element 130b is adjacent to the optical surface 119c of the third prism 119. In the embodiment, the stray light beams LS1, LS2 are reflected by the optical surface 119a and then exit the third prism 119 through the optical surface 119c. By the design of the prism device 110b (e.g., adjusting the angle A3 shown in FIG. 4, and the angle A3 may be, for example, smaller than 90 degrees), when the stray light beams LS1, LS2 incident into the prism device 110b are reflected to the sixth surface 117c of the prism device 110b, the stray light beams LS1, LS2 may pass through the sixth surface 117c and exit the prism device 110b. Further, the stray light beams LS1, LS2 may be reflected by the optical surface 119a of the third prism 119 to the light absorbing element 130b.

The stray light beams LS1, LS2 of the embodiment are merely illustrative and are not intended to limit the invention. The stray light beams LS1, LS2 may be undesirable or not used for imaging. The stray light beams LS1, LS2 may pass through the third surface 111c and exit the first prism 111, and exit the third prism 119 through the optical surface 119c, and then may be absorbed by the light absorbing element 130b.

Figure 5:
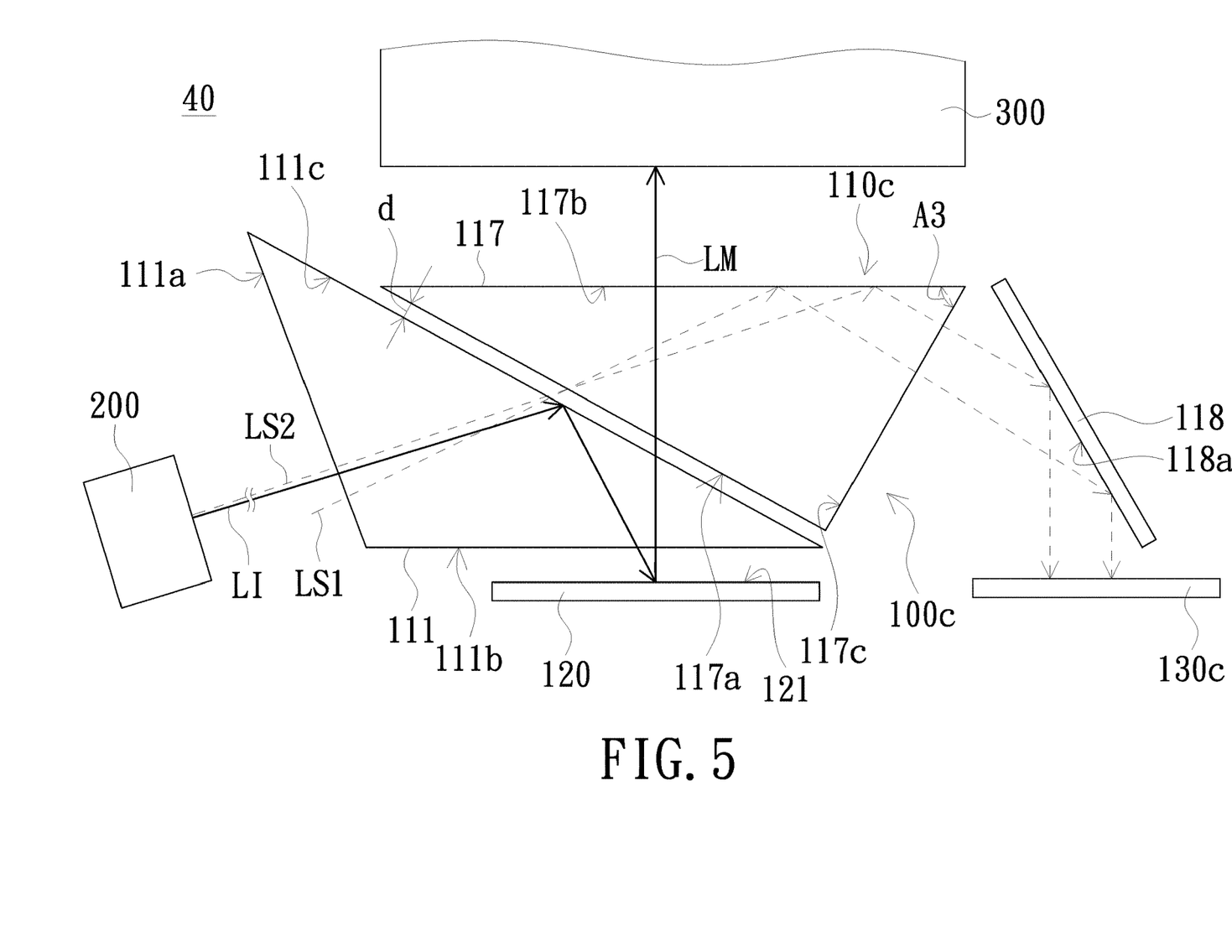
FIG. 5 is a schematic view of a projection device according to yet another embodiment of the invention.

Please refer to FIG. 5. FIG. 5 is a schematic view of a projection device according to yet another embodiment of the invention. The projection device 40 of this embodiment is similar in structure to the projection device 30 of the embodiment shown in FIG. 4, and may be used to achieve similar functions or effects. The projection device 40 of this embodiment is different from the projection device 30 of the above embodiment in that: the imaging module 100c of the projection device 40 further includes a prism device 110c and a reflective element 118. The stray light beams LS1, LS2 exit the second prism 117, and then are reflected by the reflective element 118, and then are incident on the light absorbing element 130c. Compared with the projection device 10 of the embodiment shown in FIGS. 1 and 2, the stray light beams LS1, LS2 may be emitted downward (FIG.

5) in the projection device 40 of this embodiment, and thus the projection device 40 may in used in more various instances.

In detail, the reflective element 118 includes an optical surface 118a. The stray light beams LS1, LS2 may be reflected by the optical surface 118a of the reflective element 118 to the light absorbing element 130c. In the embodiment, the reflective element 118 may be implemented, for example, by a mirror.

The stray light beams LS1, LS2 of the embodiment are merely illustrative and are not intended to limit the invention. The stray light beams LS1, LS2 may be undesirable or not used for imaging. The stray light beams LS1, LS2 may pass through the third surface 111c and exit the first prism 111, and then be reflected by the optical surface 118a of the reflective element 118, such that it may be absorbed by the light absorbing element 130c.

In summary, by disposing the light absorbing element, the projection device and the imaging module according to the embodiments of the invention may effectively absorb the stray light beam exiting the prism device, and thereby prevent the image quality of the projection device from being reduced by the stray light beam.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meanings of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism, the second prism, the first surface and the second surface are only used for distinguishing various elements and do not limit the number of the elements.

What is claimed is:

1. An imaging module, comprising a reflective display element, a prism device, and a light absorbing element, wherein:
    the reflective display element comprises a reflective display surface;
    the prism device comprises a first prism and a second prism, wherein the first prism comprises a first surface, a second surface, and a third surface, the second prism comprises a fourth surface, a fifth surface, and a sixth surface, the second surface is adjacent to the reflective display surface, the third surface is adjacent to the fourth surface, wherein a stray light beam is incident into the first prism, passes through the third surface, and then exits the first prism, wherein then the stray light beam is incident into the second prism through the fourth surface, and wherein then the stray light beam is totally reflected by the fifth surface and exits the second prism, wherein the stray light beam is a part of the beam provided by an illumination system and is not reflected by the first prism to the reflective display element; and
    the light absorbing element is disposed on a transmission path of the stray light beam exiting the second prism.

2. The imaging module according to claim 1, wherein the third surface and the fourth surface are spaced from each other by a spacing.

3. The imaging module according to claim 1, further comprising a projection lens, wherein an illumination beam incident into the first prism is reflected by the third surface and is incident on the reflective display element, wherein after the reflective display surface converts the illumination beam into an image beam, the reflective display surface reflects the image beam to the projection lens.

4. The imaging module according to claim 1, wherein the light absorbing element is adjacent to the sixth surface, and the stray light beam is reflected by the fifth surface and exits the second prism through the sixth surface.

5. The imaging module according to claim 1, wherein the second prism further comprises a seventh surface, and the light absorbing element is adjacent to the seventh surface, and wherein the stray light beam is reflected by the fifth surface and then transmitted to the sixth surface, and then the stray light beam is reflected by the sixth surface and exits the second prism through the seventh surface.

6. The imaging module according to claim 1, further comprising a reflective element, wherein the stray light beam exiting the second prism is reflected by the reflective element and is incident on the light absorbing element.

7. The imaging module according to claim 1, wherein the prism device further comprises a third prism, and the third prism comprises an optical surface, wherein the stray light beam exiting the second prism is incident into the third prism and then is reflected by the optical surface to the light absorbing element.

8. The imaging module according to claim 1, wherein the reflective display element is a digital micromirror device.

9. A projection device, comprising an illumination system, a projection lens, and an imaging module, wherein:
    the illumination system is configured to provide an illumination beam;
    the imaging module comprises a reflective display element, a prism device, and a light absorbing element, wherein:
    the reflective display element comprises a reflective display surface;

the prism device comprises a first prism and a second prism, wherein the first prism comprises a first surface, a second surface, and a third surface, the second prism comprises a fourth surface, a fifth surface, and a sixth surface, the second surface is adjacent to the reflective display surface, the third surface is adjacent to the fourth surface, wherein a stray light beam is incident into the first prism, passes through the third surface and then exits the first prism, then the stray light beam is incident into the second prism through the fourth surface, and then the stray light beam is totally reflected by the fifth surface and then exits the second prism, wherein the stray light beam is a part of the beam provided by an illumination system and is not reflected by the first prism to the reflective display element; and the light absorbing element is disposed on a transmission path of the stray light beam exiting the second prism.

10. The projection device according to claim 9, wherein the third surface and the fourth surface are spaced from each other by a spacing.

11. The projection device according to claim 9, wherein the illumination beam incident into the first prism is reflected by the third surface and is incident on the reflective display element, wherein after the reflective display surface converts the illumination beam into an image beam, the reflective display surface reflects the image beam to the projection lens.

12. The projection device according to claim 9, wherein the light absorbing element is adjacent to the sixth surface, and the stray light beam is reflected by the fifth surface and exits the second prism through the sixth surface.

13. The projection device according to claim 9, wherein the second prism further comprises a seventh surface, and the light absorbing element is adjacent to the seventh surface, and wherein the stray light beam is reflected by the fifth surface and transmitted to the sixth surface, and then the stray light beam is reflected by the sixth surface and exits the second prism through the seventh surface.

14. The projection device according to claim 9, further comprising a reflective element, wherein the stray light beam exiting the second prism is reflected by the reflective element and is incident on the light absorbing element.

15. The projection device according to claim 9, wherein the prism device further comprises a third prism, and the third prism comprises an optical surface, wherein the stray light beam exiting the second prism is incident into the third prism and then is reflected by the optical surface to the light absorbing element.

16. The projection device according to claim 9, wherein the reflective display element is a digital micromirror device.

* * * * *